3,453,807
FISSION PRODUCT TRAPPING SYSTEMS
Roland Taylor, Egremont, England, assignor to United Kingdom Atomic Energy Authority, London, England
Filed Jan. 17, 1966, Ser. No. 520,980
Claims priority, application Great Britain, Jan. 22, 1965, 3,007/65; Mar. 30, 1965, 13,433/65; July 16, 1965, 30,402/65
Int. Cl. B01d 53/16
U.S. Cl. 55—71                    3 Claims

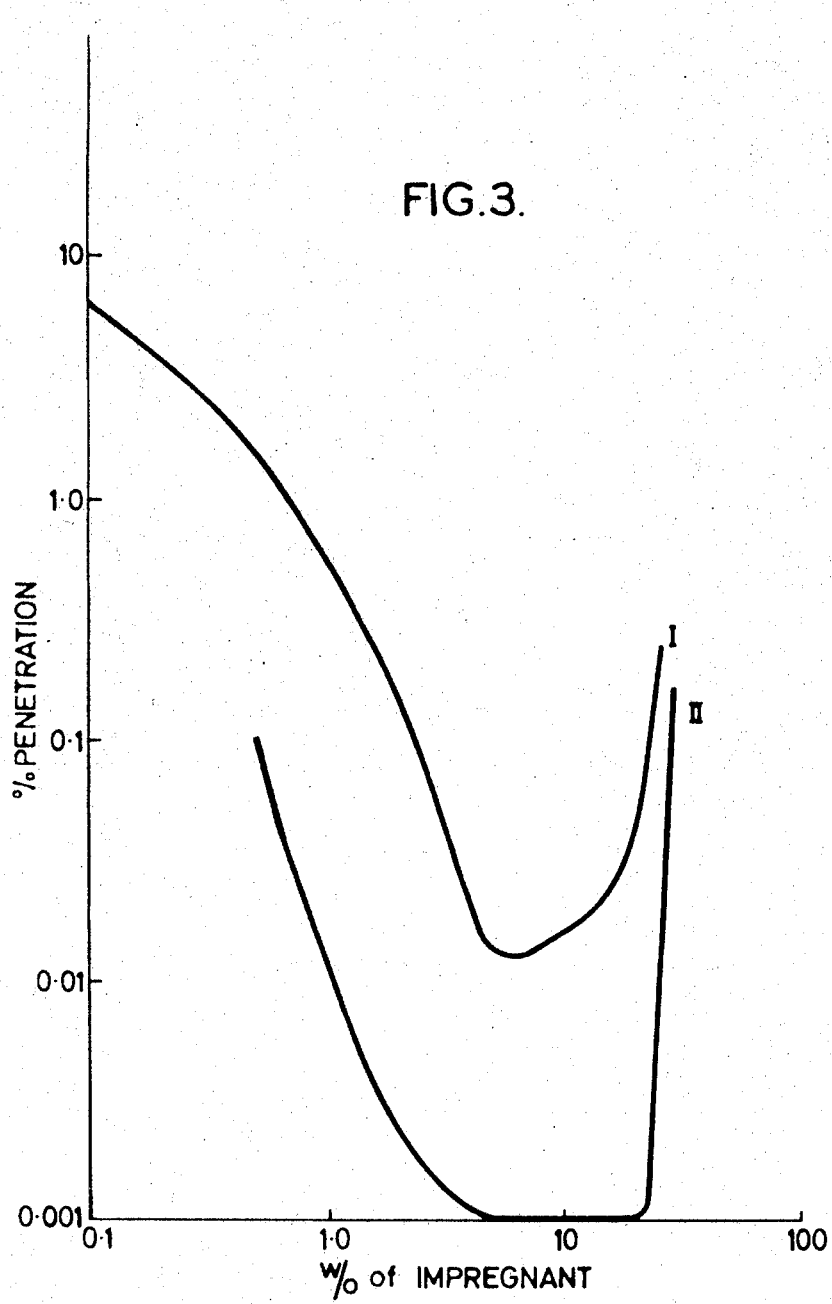

ABSTRACT OF THE DISCLOSURE

Alkyl halides, such as methyl iodide, which may be released as fission products from irradiated nuclear fuel, are trapped by providing a trapping system which comprises charcoal impregnated with a water soluble tertiary or secondary amine to remove the alkyl halide from a gas stream.

---

Figure 1:
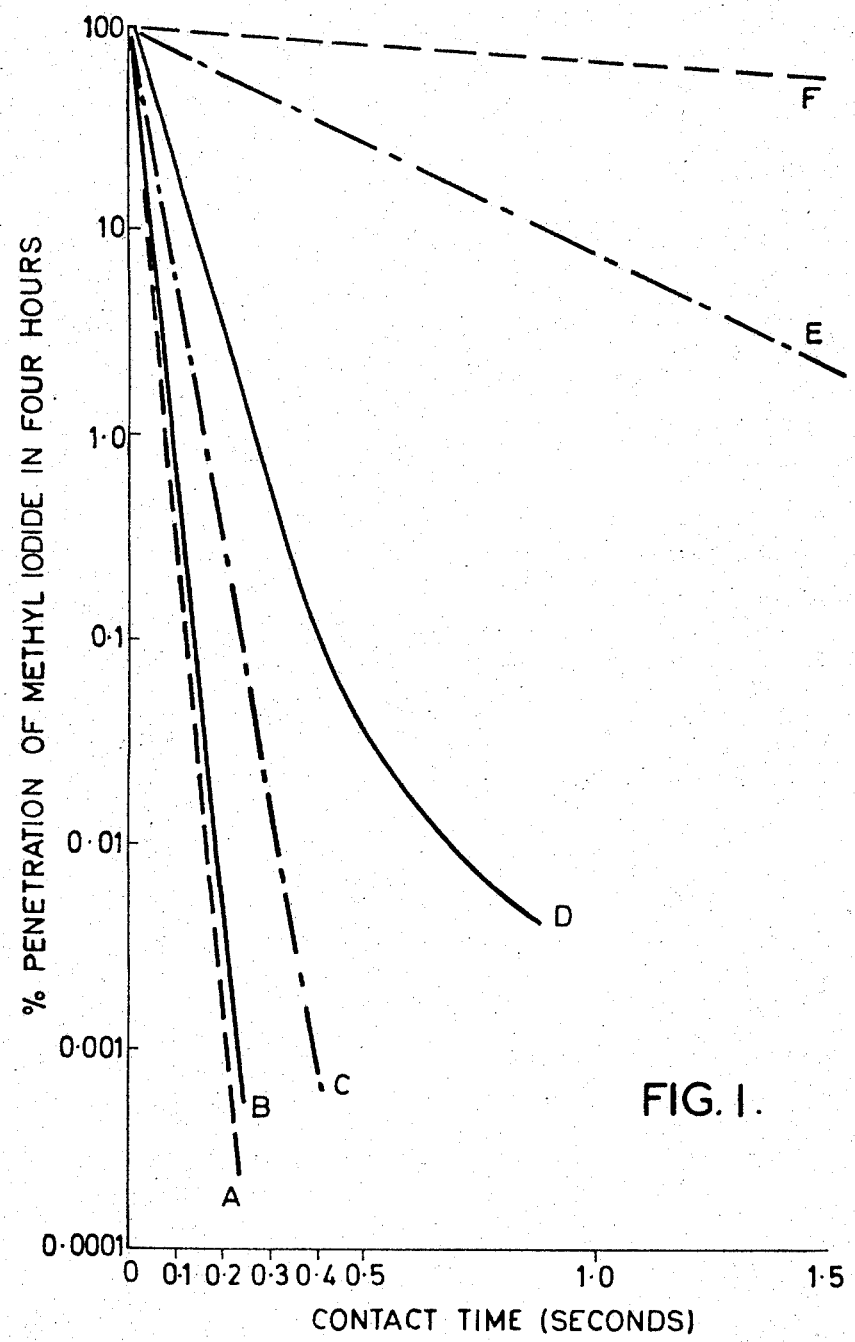

This invention relates to fission product trapping systems for nuclear installations.

It is possible that as a result of certain types of nuclear reactor accidents which have been postulated, fission products will be released from irradiated nuclear fuel in substantial amounts and these fission products will find their way into the reactor coolant circuit. Therefore, before allowing reactor collant to escape to the environment after an accident, fission products likely to present a hazard must be retained and to this end trapping systems have been developed for use in such circumstances. The same type of trapping system has also been used to remove fission products from the gases exhausted from other nuclear installations (e.g. irradiated fuel storage, breakdown or examination caves, and processing plants). Suggested trapping systems generally comprise a combination of high efficiency filters for removing particulate matter and a bed of activated charcoal provided to retain fission product vapour, of which iodine and its compounds are known to be the most important, produced during release of fission products from irradiated nuclear fuel. It has been found, however, that alkyl iodides, particularly methyl iodide, form a significant fraction of the iodine compounds and that difficulty may be experienced in effectively trapping these alkyl iodides if the vapour passing through the trapping system has a relatively high humidity (greater than about 20%). This difficulty is enhanced by the economic requirement that the contact time between the charcoal and the vapour should be as small as possible.

According to the present invention a fission product trapping system for a nuclear installation includes activated charcoal impregnated with a water-soluble, secondary or tertiary amine.

In general the higher the basicity of the amine the greater the effectiveness of the impregnated charcoal but amongst the amines tested this has not been found to be always the case. The most effective amines tested were diethylene diamine, piperidine, morpholine, piperazine and 4-amine pyridine.

If the gas flow through the impregnated charcoal is prolonged or at high temperatures morpholine and piperidine tend to be lost by volatilisation and piperazine is to be preferred. Under other conditions however, the effectiveness of morpholine and piperidine may be enhanced by dissolving in them an additional impregnant having a strong affinity for iodine. An example of such a substance is N-silver succinimide. For retaining methyl iodide in a carrier gas which is substantially carbon dioxide, or which is flowing very rapidly in large quantities triethylene diamine is considered particularly suitable.

To demonstrate the effect of a trapping system in accordance with the invention gas carrying methyl iodide labelled with iodine 131 was passed through a demister, an absolute filter and then through a bed of impregnated charcoal 6″ deep by 1″ diameter. The carrier gas was air, carbon dioxide, or air/$CO_2$ mixtures at a relative humidity between 99% and 100% measured at the operating temperature of the charcoal bed (usually 20° C.). The gas velocity at the face of the bed was varied from 20 to 120 linear ft./minute. The amount of methyl iodide which penetrated the absorbent bed was indicated by comparing samples of gas from up-stream and down-stream of the absorbent bed and this was checked by the amount of methyl iodide remaining on the bed at the end of the experiment. In all experiments the charcoal beds were equilibrated with the carrier gas at the appropriate relative humidity for 16 hours (i.e. until the outgoing gas from the bed had the same relative humidity as the inlet gas). The bed was loaded with the methyl iodide over a period of 10 minutes and was then eluted with the appropriate gas for four hours.

The following results were obtained:

| Impregnated Charcoal | Weight of $CH_3$ loaded to bed (µg $CH_3I$/charcoal) | Carrier Gas | | Face Velocity at bed, ft./minute | Penetration of methyl iodide through bed in four hours, percent |
|---|---|---|---|---|---|
| | | Air, percent | $CO_2$, percent | | |
| Morpholine: | | | | | |
| 1 w/o | 100 | 100 | | 20 | 0.003 |
| 13 w/o | 100 | 100 | | 20 | 0.002 |
| 1 w/o | 100 | 100 | | 40 | 0.01 |
| 1 w/o | 100 | 100 | | 80 | 0.18 |
| 1 w/o | 200 | 100 | | 40 | 0.06 |
| 1 w/o | 100 | 99 | 1 | 20 | 0.06 |
| 11 w/o | 100 | 97 | 3 | 20 | 0.43 |
| 10 w/o | 100 | 99 | 1 | 20 | 0.012 |
| 30 w/o | 100 | 50 | 50 | 20 | 38.6 |
| Piperidine: | | | | | |
| 1 w/o | 100 | 100 | | 20 | 0.004 |
| 5 w/o | 100 | 100 | | 20 | 0.004 |
| 1 w/o | 100 | 99 | 1 | 20 | 0.008 |
| 10 w/o | 100 | 99 | 1 | 20 | 0.002 |
| 30 w/o | 100 | 99 | 1 | 20 | 3.20 |
| 4-amino pyridine: 5 w/o | 100 | 100 | | 20 | 0.07 |
| Piperazine: | | | | | |
| 10 w/o | 100 | | 100 | 20 | 0.07 |
| 10 w/o | 100 | 100 | | 20 | <0.0005 |
| Triethylene diamine: | | | | | |
| 5 w/o | 100 | 100 | | 20 | <0.0005 |
| 5 w/o | 100 | 100 | | 120 | 0.005 |
| 5 w/o | 100 | | 100 | 50 | 0.005 |

Results indicating retention of methyl iodide were also obtained using the following secondary and tertiary amines as impregnants:

Dicyclohexylamine, 5-amino acridine, 2-amino pyridine, acridine, pyridine, isoquinoline, quinoline, pyrrole, 22' dipyridyl, N,N'diphenylguanidine, iminazole, tri-n-butylamine, hexamethylene tetramine, succinimide, 4-amino phenazone, guanidine carbonate, diethanolamine, triethanolamine, N-methyl N-phenyl benzylamine, N-(2 amino ethyl)-ethanolamine, N,N-dimethyl benzylamine, dimethyl formamide, 3-diethyl aminopropane-1-ol, 2-diethylaminoethanol, N,N-diphenyl benzylamine.

To illustrate the performance of piperazine under conditions of high temperature and prolonged gas flow a bed of coal-based charcoal impregnated with 5 w/o of piperazine and providing a gas stay-time of 1.5 sec. was loaded with 100 µg. methyl iodide per gram of charcoal over a period of about 15 minutes in a flow of steam which was condensing in the bed and raising its temperature from 20° C. to about 100° C. The bed was then heavily lagged and steam at 110° C. passed through it for 10 hours. The total penetration of methyl iodide through the bed in this time was 0.03% which increased only to 0.034% after a further 125 hours exposure of the bed to a flow of saturated air at room temperature. A further quantity of methyl iodide was then presented to the bed in saturated air at room temperature, making 200 µg. methyl iodide per gram charcoal in all. The cumulative penetration during the succeeding two hours increased to 1.5% but did not increase further during the next 135 hours exposure to the flow of saturated air. Such a charcoal bed is therefore capable of providing a decontamination factor of about 100 to methyl iodide for a 1½ second stay-time under extreme conditions of operation.

Figure 2:
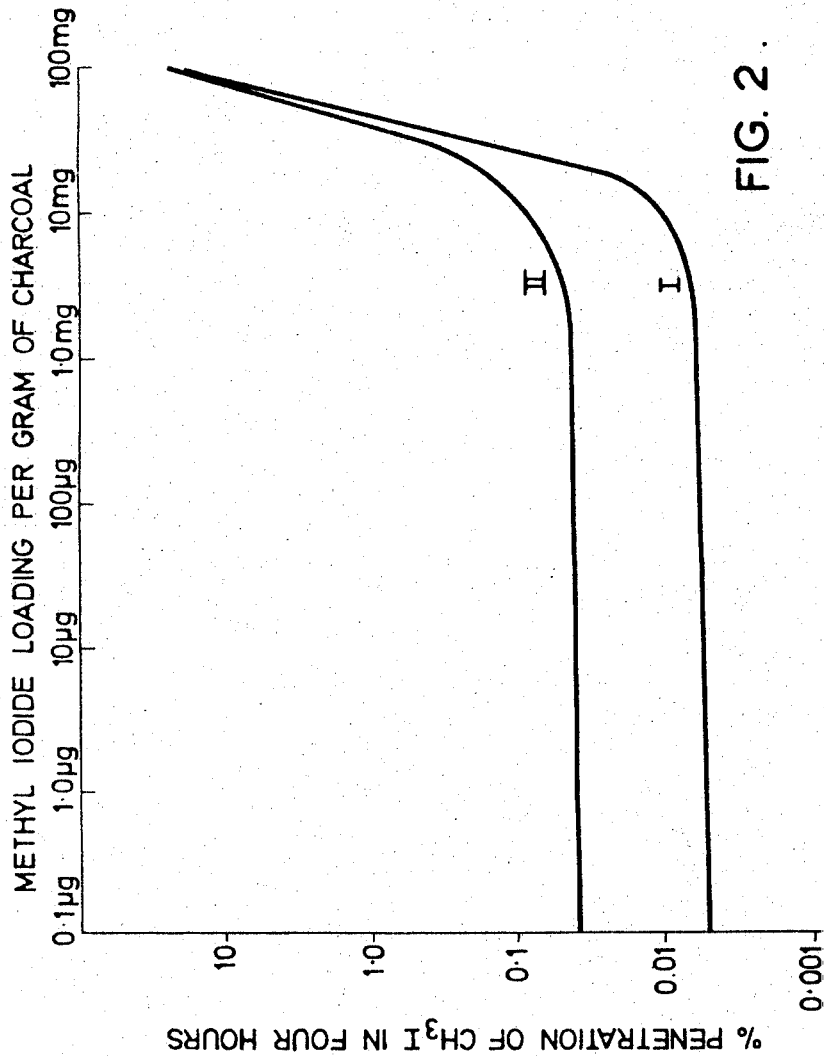

In all experiments the greater part of the methyl iodide penetration occurred during the first hour after loading. The penetration of methyl iodide during the fourth hour was often near the limit of detection of the apparatus (0.0003%). Penetration does however depend on the contact time between charcoal and gas (that is the ratio of volume of gas to flow-rate through the charcoal) and on the methyl iodide load on the charcoal. The effect is illustrated in the attached graphs in which FIGURE 1 shows the decrease in penetration with increase in contact time and FIGURE 2 shows increase in penetration with loading. In FIGURE 1 Curve A represents unimpregnated charcoal in air and carbon dioxide under dry conditions, the other curves represent results obtained by experiments as described above using the following:

Curve B—5 w/o triethylene diamine in air
Curve C—10 w/o piperazine in air
Curve D—5 w/o triethylene diamine in 100% $CO_2$
Curve E—10 w/o piperazine in 100% $CO_2$
Curve F—Unimpregnated coal base charcoal in air and $CO_2$ In FIGURE 2 Curve I represents triethylene diamine impregnated charcoal eluted with air and Curve II triethylene diamine impregnated charcoal eluted with carbon dioxide, the contact time being 0.2 sec. throughout and the relative humidity 99–100%. It will be noted that breakthrough of methyl iodide does not become significant until the loading exceeds 10 mg. methyl iodide per gram of charcoal.

The preferred method of impregnation is to soak coal-based charcoal in an aqueous solution of the amine and then allow the water to evaporate off. Gentle heating to 100–120° C. is allowable. Other standard impregnation techniques such as spraying may be used provided no impurities are introduced to the charcoal with the amine solution. Effectiveness does not necessarily increase with increase in weight of impregnant however, and FIGURE 3 shows the variation in penetration with triethylene diamine impregnated charcoal (Curve I) and piperazine impregnated charcoal (Curve II) as the weight of impregnant increases. The results were obtained by experiments similar to those already described, the contact time for Curve I being approximately 0.2 sec. and for Curve II approximately 1.5 secs.

I claim:

1. A method of extracting methyl iodide from a gas stream, said method comprising passing a gas stream through a bed of activated charcoal comprising charcoal impregnated with a water-soluble secondary amine selected from the group consisting of morpholine, piperidine, piperazine, and triethylenediamine.

2. The method of claim 1 wherein said amine comprises piperazine.

3. The method of claim 1 wherein said amine comprises triethylenediamine.

References Cited

UNITED STATES PATENTS

| 2,963,441 | 12/1960 | Dolian | 252—190 |
| 2,818,323 | 12/1957 | Haensel | 23—2 |

DANIEL E. WYMAN, *Primary Examiner.*

P. M. FRENCH, *Assistant Examiner.*

U.S. Cl. X.R.

55—74, 387; 252—428

UNITED STATES PATENT OFFICE
CERTIFICATE OF CORRECTION

PATENT NO. : 3,453,807
DATED : July 8, 1969
INVENTOR(S) : Roland Taylor

It is certified that error appears in the above-identified patent and that said Letters Patent are hereby corrected as shown below:

Column 2, line 13, delete "diethylene" and insert

--triethylene--.

Claim 1, line 4, delete "secondary".

Signed and sealed this 29th day of April 1975.

(SEAL)
Attest:

RUTH C. MASON
Attesting Officer

C. MARSHALL DANN
Commissioner of Patents
and Trademarks